US006710337B2

(12) United States Patent
Engelhardt et al.

(10) Patent No.: US 6,710,337 B2
(45) Date of Patent: Mar. 23, 2004

(54) LASER SCANNING MICROSCOPE AND SHUTTER FOR AN OPTICAL SYSTEM

(75) Inventors: Johann Engelhardt, Bad Schoenborn (DE); William C. Hay, Heppenheim (DE); Juergen Hoffmann, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 169 days.

(21) Appl. No.: 09/884,625

(22) Filed: Jun. 19, 2001

(65) Prior Publication Data

US 2002/0005483 A1 Jan. 17, 2002

(30) Foreign Application Priority Data

Jun. 21, 2000 (DE) ........................................ 100 29 444

(51) Int. Cl.[7] .................................................. G21K 7/00
(52) U.S. Cl. ....................................................... 250/309
(58) Field of Search .......................... 250/309; 359/388, 359/812; 350/486; 256/309

(56) References Cited

U.S. PATENT DOCUMENTS 3,651,258 A * 3/1972 Ammann ..................... 178/15
4,350,417 A * 9/1982 Freeman ...................... 353/90
4,764,002 A * 8/1988 Wilson ....................... 350/486
5,535,052 A * 7/1996 Jorgens ...................... 359/388
6,384,990 B1 * 5/2002 Holdener et al. ........... 359/812

* cited by examiner

*Primary Examiner*—John R. Lee
*Assistant Examiner*—Phillip A Johnston
(74) *Attorney, Agent, or Firm*—Simpson & Simpson, PLLC

(57) ABSTRACT

An optical arrangement, in particular a laser scanning microscope, having a light source, in particular a laser light source, and an interruption device (1) for a light beam (2) of the light source, is configured, in the interest of reliable operation, in such a way that means (3) for monitoring the functioning of the interruption device (1) are associated with the interruption device (1). The invention additionally concerns a shutter (5) for a light beam (2) of a light source, in particular a laser light source, which, again in the interest of reliable operation of an optical arrangement, is characterized by at least two movable components (6, 7) which are configured and arranged such that the mechanical momentum generated by a moving component (6) or by several moving components is compensated for by the motion of the other component (7) or components.

27 Claims, 4 Drawing Sheets

8
5
1
5
13
12
6
7
3
11
4
9

5
1
2
8
13
12
6
7
3
4
9

LASER SCANNING MICROSCOPE AND SHUTTER FOR AN OPTICAL SYSTEM

CROSS REFERENCE TO RELATED APPLICATIONS

This invention claims priority of the German patent application DE 100 29 444.8 filed Jun. 21, 2000 which is incorporated by reference herein.

FIELD OF THE INVENTION

The invention concerns a laser scanning microscope, having a light source, in particular a laser light source, and an interruption device for a light beam of the light source.

The invention furthermore concerns a shutter for an optical system.

BACKGROUND OF THE INVENTION

Optical arrangements of the type in question have been known from practical use for some time, and exist in a wide variety of embodiments. Laser light sources are often used as the light source, often being combined by means of with an interruption device for a laser light beam. The purpose of such interruption devices is to interrupt or block the laser beam when any manipulations of the optical arrangement or of a specimen need to be performed. The purpose of such an interruption or blockage is to protect operating personnel and equipment. In particular in the event of a fault in an optical arrangement or improper operation, it is advantageous to interrupt the light beam in order to avoid any risk to the operator or damage to the arrangement.

It is problematic in the context of the known optical arrangement, however, that the occurrence of a fault or defect in the region of the interruption device, which impairs or even completely prevents functioning of the interruption device, is often not detected in good time. This can result in a risk to the health of the operator, and damage to the optical arrangement.

SUMMARY OF THE INVENTION

It is therefore the object of the present invention to describe a laser scanning microscope of the kind cited initially in which reliable operation is achieved with means of simple design.

The above object is achieved by a laser scanning microscope comprising:

- a light source, in particular a laser light source defining a light beam,
- an interruption device for the light beam, and
- means for monitoring the functioning of the interruption device being associated with the interruption device wherein the means are configured to monitor the interruption state generated by the interruption device.

It is a further object of the present invention to provide a system which shows a high standard of security for the user without a limitation to the optical properties of the system.

The above object is achieved by system a comprising:

- a light beam of a laser light source, and
- at least two movable components being configured and arranged so that the mechanical momentum generated by at least one moving component is compensated for by the motion of at least another component.

What has been recognized according to the present invention is that by monitoring the functioning of the interruption device, the aforesaid object is achieved in surprisingly simple fashion. For that purpose, means for monitoring the functioning of the interruption device are associated with the interruption device. By monitoring the functioning of the interruption device, it is now possible to understand clearly whether the interruption device is working reliably. Manipulations of the arrangement and of a specimen that is being examined can thus be performed with an increased degree of operating reliability, with no undesired penetration of the light beam, or portions of the light beam, through the optical arrangement. Any risk to the operator or the optical arrangement is thus very largely eliminated.

Concretely, the means could be configured to monitor the interruption state generated by the interruption device. In other words, the means for monitoring the functioning of the interruption device could monitor whether the interruption device is definitely interrupting the light beam of the light source.

For optical and/or acoustic presentation of the functional state of the interruption device, an optical and/or acoustic indication could be provided for the presence and/or absence of an interruption state. An operator could in this fashion easily determine whether functioning of the interruption device is guaranteed.

In particularly simply designed fashion, the means could have a light barrier and could have an opening configured in the interruption device. The physical position of the interruption device or of a component of the interruption device could thereby be detected in simple fashion. For example, the interruption device or a component of the interruption device could be correctly positioned when a light beam of the light barrier passes through the opening.

Alternatively or in addition to a light barrier, the means could have an electrical switch, preferably an interrupter contact. With this, a specific physical position of the interruption device or of a component of the interruption device could be detected. For example, in the interrupted state of the light beam of the light source, a detection circuit could also be interrupted.

By way of the aforesaid features in particular, the functionality of the interruption device could be checked in quasi-active fashion. In the interest of particularly reliable monitoring of the functioning of the interruption device, the means could have an analysis unit with which the at least one safety device is activatable. The analysis unit could comprise an electronic or mechanical logic system, or a computer, with which the safety device could be automatically activatable. In this context, the safety device, for example a safety circuit, could be activatable directly via the electronic or mechanical logic system or arrangement, or indirectly via the computer.

Concretely, a signal could be transmittable to the light source and/or to a further interruption device by the analysis unit and/or the safety device. It is possible, for example, to switch off a laser in the event of a malfunction of the interruption device, via an electrical emergency shutdown input present on most laser systems.

To compensate for electronic or mechanical switching times, a delay device could be provided in terms of activation of the safety device and/or transmission of the signal. The safety device could, in this context, be activatable only after a predefined time.

Further in the interest of particularly reliable operation of the optical arrangement, an indication of a malfunction of the interruption device and/or of an activation of the safety device could be provided. A continuous or periodically occurring self-test of the interrupt device is conceivable in this context. Alternatively or additionally, for this purpose an indication could be provided that energy supply to the interruption device is not guaranteed. Such an indication could operate optically and/or acoustically.

In particularly simple and economical fashion, the interruption device could have a mechanical shutter. Shutters of this kind can be of very inexpensive construction.

Further in the interest of reliable operation of the optical arrangement, the interruption device or shutter could have at least two movable components which are configured and arranged in such a way that the mechanical momentum generated by a moving component or by several moving components is compensated for by the motion of the other component or components. Vibrations during the operation of the interruption device or shutter, which occur in conventional interruption devices or shutters, can hereby be eliminated. Such vibrations on the one hand can result in the misalignment of optical components, and on the other hand can impair the functionality of the optical arrangement until the vibrations die down. In extreme cases, a loosening of threaded connections can result in permanent damage to the optical arrangement, thus preventing reliable operation of the optical arrangement.

With an interruption device constructed as described above, or a correspondingly constructed shutter, no mechanical disruptions are caused. A kind of momentum compensation takes place, so that almost no momentum is transmitted to surrounding components.

To achieve the goal of momentum compensation, the components could be of identical or mirror-symmetrical configuration. Alternatively or additionally, the components could have the same mass.

In the context of the momentum-compensating interruption device or of a corresponding shutter, it is conceivable for not every component to be provided for beam interruption. One or more components could also be provided merely as a counterweight in order to achieve overall momentum compensation.

Concretely, the components could be arranged for straight-line and/or rotational motion. In the interest of reliable momentum compensation, both types of motion are conceivable, in separate or combined fashion. In particularly advantageous fashion, the components could be arranged for oppositely directed motion.

Quite concretely, at least one component could be configured as a barrier or rocker; in particularly simple fashion, two barriers or rockers could be provided.

For reliable passage of the light beam of the light source, at least one component could have an opening for the light beam. The beam path for the light beam is thereby limited to the scope of the opening.

In the interest of a simple and dependable drive system for the components, the components could be movable by a motion device which converts an electrical signal into a mechanical motion. The motion device could have an electromagnet.

As defined in claim 25, the present invention concerns a shutter for a light beam of a light source, in particular a laser light source. In the interest of low-vibration and thus reliable operation of an optical arrangement, the shutter is configured in such a way that at least two movable components are provided, which are configured and arranged such that the mechanical momentum generated by a moving component or by several moving components is compensated for by the motion of the other component or components.

Concretely, the components could be of identical or mirror-symmetrical configuration. Alternatively or additionally, the components could have the same mass.

Among the components, at least one component could be a counterweight that does not have a beam-interrupting function but rather only a momentum-compensating function. Concretely, the components could be arranged for straight-line and/or rotational motion. An arrangement of the components for oppositely directed motion would be particularly advantageous.

At least one component could be configured as a barrier or rocker, two barriers or rockers preferably being provided.

For passage of the light beam of the light source, at least one component could have an opening for the light beam. In particularly advantageous fashion, at least two components could be movable toward one another in such a way that the respective openings of the components lie one above another, thus allowing passage of the light beam of the light source.

The components could be movable by a motion device which converts an electrical signal into a mechanical motion. A motion device of this kind could have an electromagnet. In particularly advantageous fashion, means for monitoring the interruption state of the light beam generated by the shutter could be associated with the shutter. Alternatively or additionally, an optical and/or acoustic indication for the presence and/or absence of an interruption state could be provided.

It is a further advantage of the present invention to have an optical arrangement which makes possible reliable operation preferably using a shutter. In this context, the functionality of the shutter or of an interruption device is actively checked by a suitable arrangement. In the event a malfunction is detected, at least one second safety circuit could be activated. Activation of the second safety circuit could be accomplished directly via an electronic or mechanical logic arrangement. Alternatively, activation of the second safety circuit could be accomplished indirectly via a computer system. To compensate for electronic or mechanical switching times, the logic system processing the fault signal could activate the downstream safety circuit only after a preferably short time. The malfunction of the interruption device or the shutter, and/or the activation of the downstream safety device, could be indicated optically and/or acoustically. In addition, the fact that energy delivery to the interruption device or to the shutter is not guaranteed could be indicated optically and/or acoustically.

Concretely, the interruption device or shutter could be equipped with a detection means for function testing. The interruption device or shutter could be configured in such a way that almost no momentum is transmitted to its surroundings. The absence of momentum transmission could be achieved by the fact that the momentum of a moving component is compensated for by an identical or mirror-symmetrical component that simultaneously executes an oppositely directed motion. The symmetry property of the moving components could be brought about not only by way of external shape, but also by way of the mass of the components if the shape is possibly different. Alternatively, the absence of momentum transmission could be achieved by the fact that the momentum of a moving component is compensated for by a counterweight that simultaneously executes an oppositely directed motion.

The shutter could have at least one barrier or rocker for beam interruption. Preferably the shutter could have two barriers or rockers for beam interruption.

Beam interruption could be accomplished both by straight-line motions and by rotational motions. The barrier or barriers or the rocker or rockers could be moved by at least one device for converting an electrical signal into a mechanical motion.

A light barrier and/or an electrical switch could be used as the detection means for functional testing. The barrier or barriers or the rocker or rockers could be moved by an electromagnet. The beam path could be interrupted or not interrupted when the electromagnet is currentless. The interruption device or shutter could be of very compact construction overall.

BRIEF DESCRIPTION OF THE DRAWINGS

There are various ways of advantageously embodying and developing the teaching of the present invention. In conjunction with the description of the preferred exemplary embodiments of the invention with reference to the drawings, an explanation is also given of generally preferred embodiments and developments of the teaching. In the drawings.

DETAILED DESCRIPTION OF THE INVENTION

Figure 1:
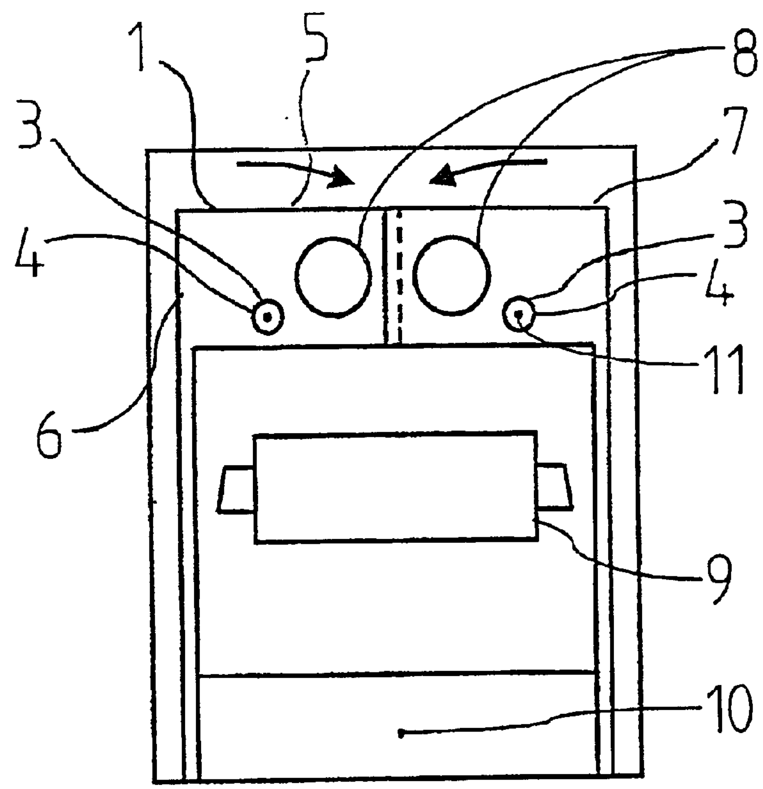
FIG. 1 shows, in a schematic front view, a first exemplary embodiment of a shutter according to the present invention in the closed state.
Figure 2:
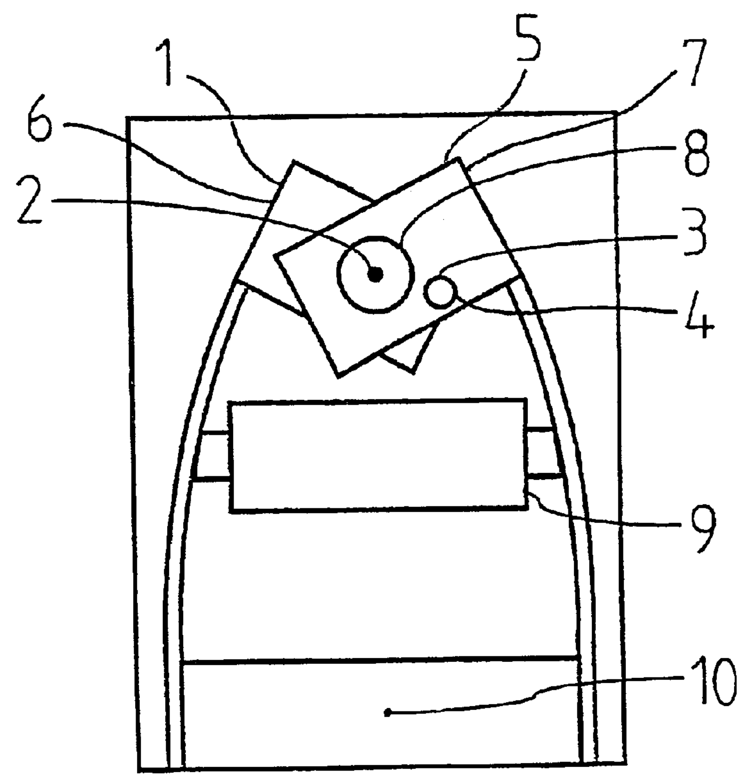
FIG. 2 shows, in a schematic front view, the exemplary embodiment of FIG. 1 in the open state.

FIGS. 1 and 2 show, in a schematic front view, a first exemplary embodiment of an interruption device 1 according to the present invention for a light beam 2 of a light source, in particular a laser light source. Interruption device 1 can be used with any kind of optical arrangement in which a light beam is optionally interrupted. In the interest of reliable operation of the optical arrangement, means 3 for monitoring the functioning of interruption device 1 are associated with interruption device 1. Means 3 for monitoring the functioning of interruption device 1 have a light barrier (not shown), of which only its light beam 11 is visible, and an opening 4 configured in interruption device 1.

FIG. 1 shows interruption device 1, configured as shutter 5, in the closed state, i.e. with light beam 2 of the light source interrupted. In this state, light beam 11 of the light barrier can pass through opening 4, and detection of the closed state of shutter 5 is possible.

Concretely, shutter 5 has two components 6 and 7 that are of mirror-symmetrical configuration and are movable rotationally and in opposite directions in order to open shutter 5. When shutter 5 is in the open state, openings 8 configured in components 6 and 7 are slid over one another so that light beam 2 can pass through the shutter. Movement of components 6 and 7 is effected by an electromagnet 9, which moves components 6 and 7 toward one another when current flows through it. In this state, electromagnet 9 holds components 6 and 7 with respect to one another in such a way that light beam 2 can pass through openings 8.

Components 6 and 7 are fastened to a mounting block 10. The momentum-compensated shutter 5 is of very compact construction. Components 6 and 7 are configured as barriers which each have an opening 8 for light beam 2. To release light beam 2, openings 8 are brought into registration. The barriers are resiliently fastened to mounting block 10.

The purpose of the light barrier signal is to switch off the light source, via a directly wired electronic logic system, in the event of a malfunction of shutter 5.

Figure 3:
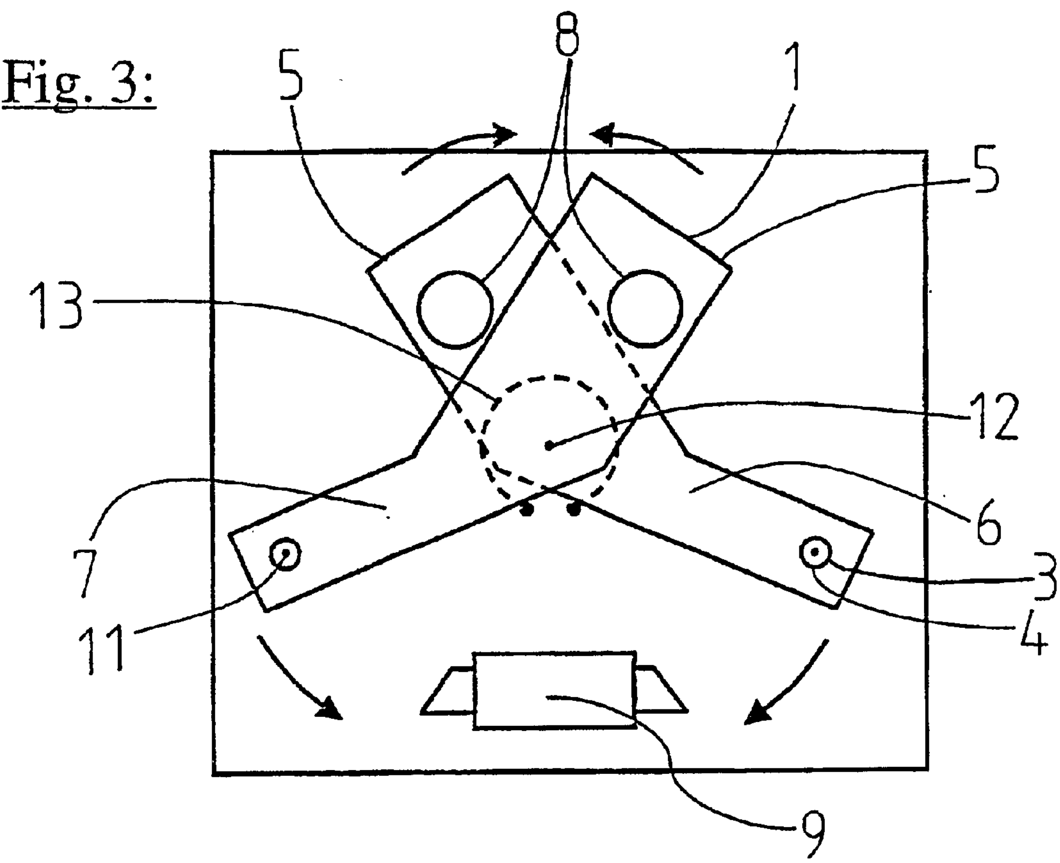
FIG. 3 shows, in a schematic front view, a second exemplary embodiment of a shutter according to the present invention in the closed state.
Figure 4:
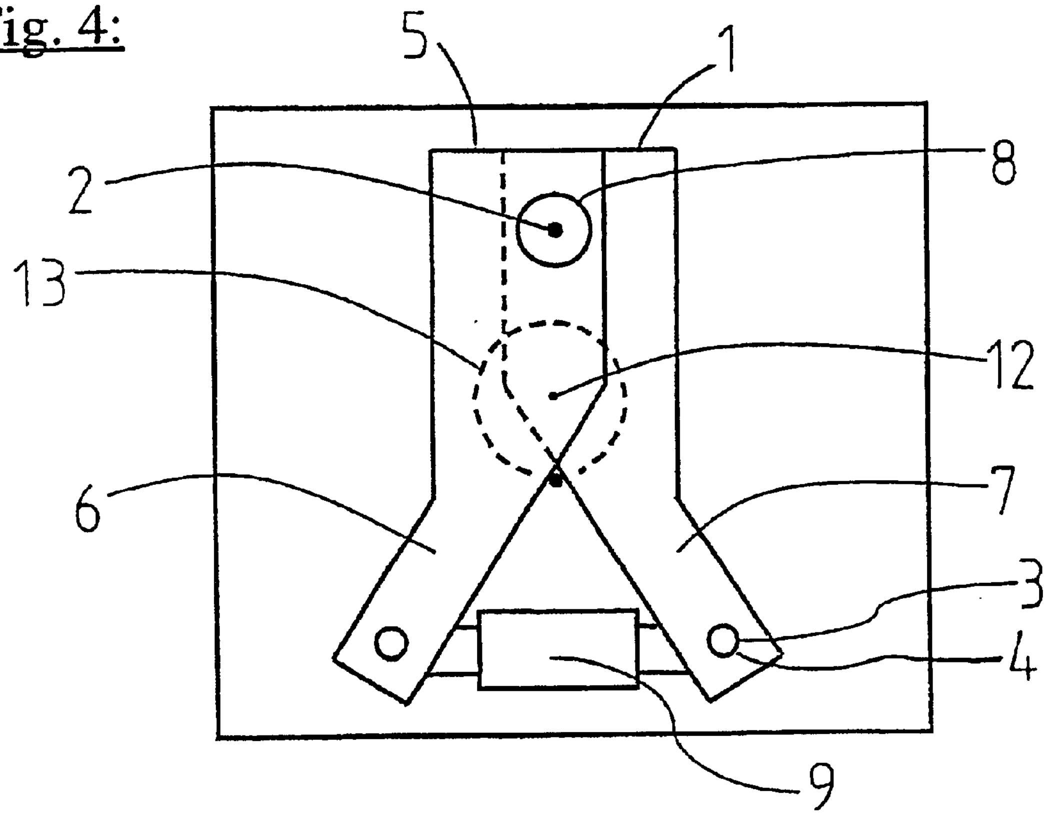
FIG. 4 shows, in a schematic front view, the second exemplary embodiment of FIG. 3 in the open state.

FIGS. 3 and 4 show, in a schematic front view, a second exemplary embodiment of a interruption device 1 in the closed and open state for light beam 2. Interruption device 1, configured as shutter 5, also has means 3 for monitoring the functioning of interruption device 1. For that purpose, openings 4 for light beam 11 of a light barrier are configured in components 6 and 7 of shutter 5.

As shown in FIG. 4, light beam 2 passes through openings 8 configured in components 6 and 7 when those openings 8 are brought into registration.

In the momentum-compensated shutter 5, components 6 and 7 are configured as two symmetrically arranged rockers that are mounted on a common rotation axis 12. The rockers are scissored apart by means of a spring 13 (a helical expander spring) arranged coaxially with rotation axis 12. To release light beam 2, openings 8 are brought into registration so that light beam 2 can pass through. The rockers are moved symmetrically and in opposite directions by electromagnet 9. When magnet 9 is currentless, light beam 2 is blocked.

In the second exemplary embodiment of a shutter 5 as well, the purpose of the light barrier signal is to switch off the light source, via a directly wired electronic logic system, in the event of a malfunction of shutter 5.

Figure 5:
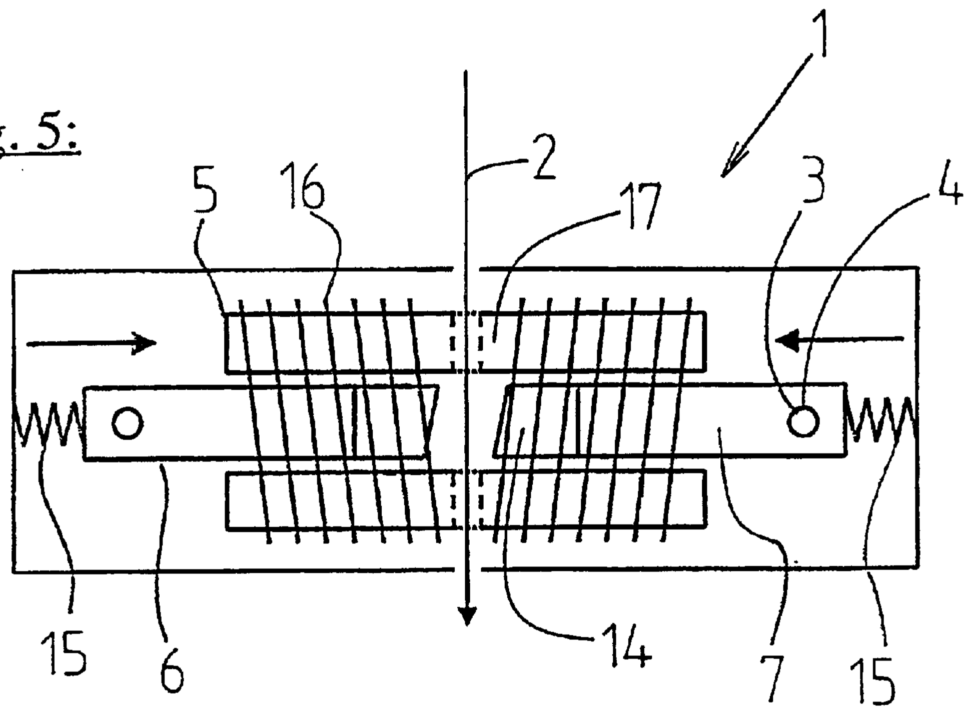
FIG. 5 shows, in a schematic front view, a third exemplary embodiment of a shutter according to the present invention in the open state.
Figure 6:
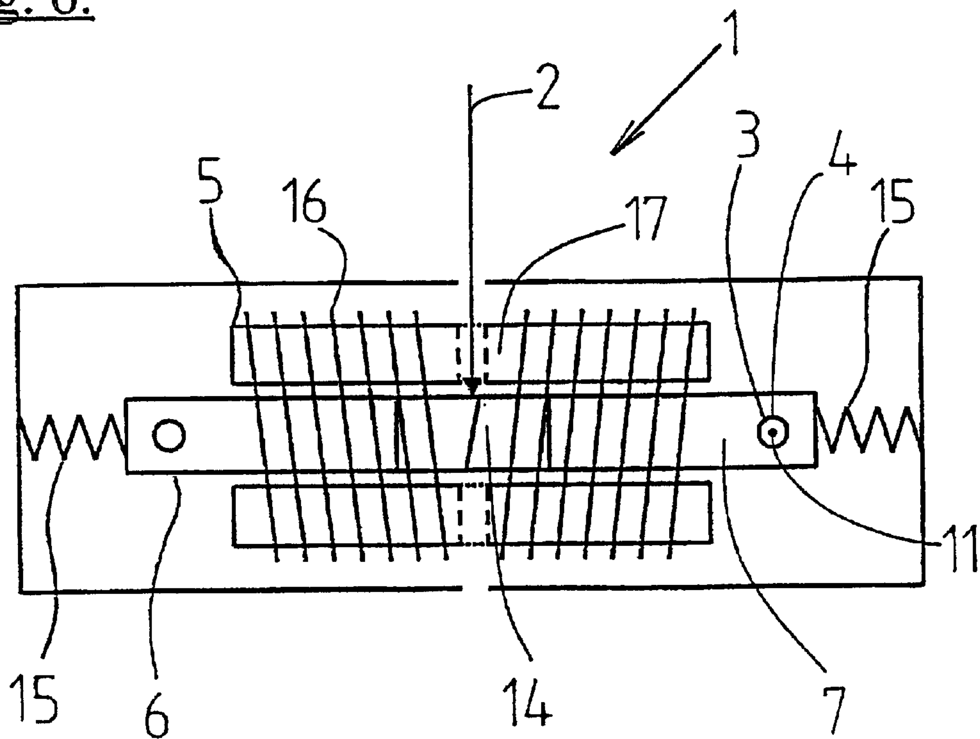
FIG. 6 shows, in a schematic front view, the exemplary embodiment of FIG. 5 in the closed state.

FIGS. 5 and 6 show, in a schematic front view, a third exemplary embodiment of an interruption device 1 according to the present invention that is configured as shutter 5. FIG. 5 shows shutter 5 in the open state, and FIG. 6 shows shutter 5 in the closed state. The momentum-compensated shutter 5 comprises two symmetrically arranged components 6 and 7 in the form of magnets, each of which is equipped with a nonmagnetic tip 14. Components 6 and 7 are in the form of barriers, and are pushed by two springs 15 into coils 16. Coils 16 surround cores 17. To release light beam 2 of the light source, coils 16 are activated so that the magnets are slid outward against the spring forces, making it possible for light beam 2 to pass through. Because coils 16 are suitably polarized, the magnets move symmetrically and in opposite directions. When coils 16 are currentless, light beam 2 is blocked.

Nonmagnetic tips 14 prevent shutter 5 from opening completely or partially because of the mutual repulsion of the permanent magnets.

Each magnet or each component 6 and 7 has means 3 for monitoring the functioning of interruption device 1. Means 3 have an opening 4 configured in each component 6 and 7 for a light beam 11 of a light barrier. In this exemplary embodiment as well, the purpose of the light barrier signal is to switch off the light source, via a directly wired electronic logic system, in the event of a malfunction of shutter 5.

Figure 7:
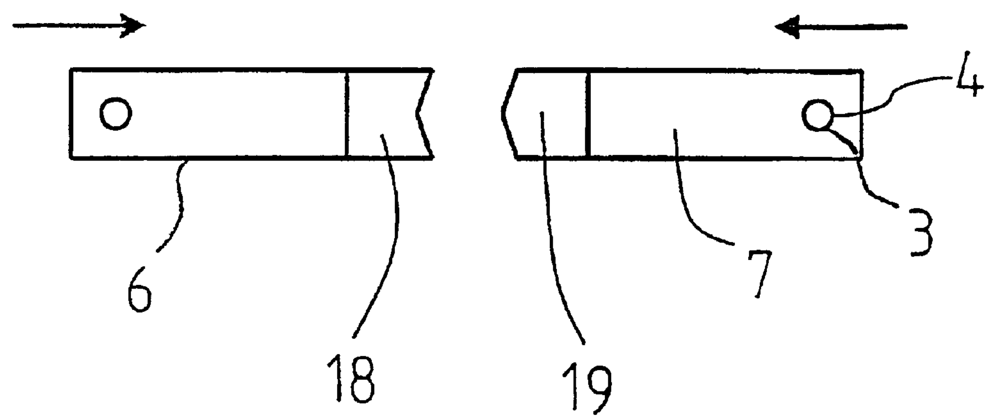
FIG. 7 shows, in a schematic front view, alternatively configured closure tips for a shutter according to FIGS. 5 and 6, in the open state.
Figure 8:
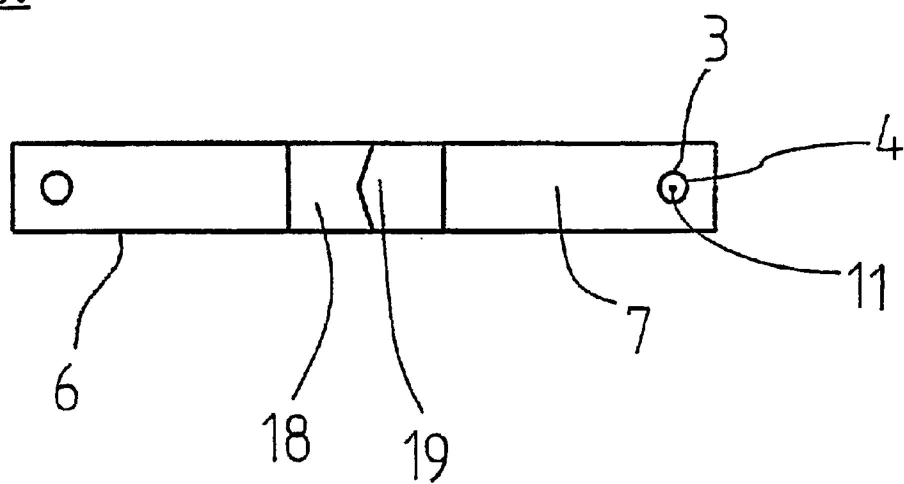
FIG. 8 shows, in a schematic front view, the closure tips of FIG. 7 in the closed state.

FIGS. 7 and 8 show, in a schematic front view, alternatively configured closure tips 18 and 19 for a shutter 5 as shown in FIG. 5 and 6, in the opened and closed states. Closure tips 18 and 19, and thus components 6 and 7, differ in terms of their shape but have the same mass. Closure tips 18 and 19 configured in this fashion have less of a tendency to jam, resulting in more reliable operation of an optical arrangement or shutter 5.

In order to avoid repetition, the reader is referred to the general portion of the specification and to the appended claims regarding further advantageous embodiments and developments of the interruption device according to the present invention.

In conclusion, be it noted explicitly that the exemplary embodiments described above are provided merely for discussion of the teaching claimed, but do not limit it to those exemplary embodiments.

PARTS LIST

1 Interruption device
2 Light beam
3 Monitoring means
4 Opening
5 Shutter
6 Component
7 Component
8 Opening
9 Electromagnet
10 Mounting block
11 Light beam
12 Rotation axis
13 Spring
14 Nonmagnetic tip
15 Spring
16 Coil
17 Core
18 Closure tip
19 Closure tip

What is claimed is:

1. A laser scanning microscope, comprising:

a light source, in particular a laser light source defining a light beam, an interruption device (1) for the light beam (2), and means (3) for monitoring the functioning of the interruption device (1) being associated with the interruption device (1) wherein the means (3) are configured to monitor the interruption state generated by the interruption device (1).

2. The laser scanning microscope as defined in claim 1, wherein an optical and/or acoustic indication is provided for indicating the position of the interruption device (1) in or out of the light beam (2).

3. The laser scanning microscope as defined in claim 1, wherein the means (3) for monitoring have a light barrier and the interruption device (1) has an opening (4) formed therein.

4. The laser scanning microscope as defined in claim 1 wherein the means for monitoring have an electrical switch, preferably an interrupter contact.

5. The laser scanning microscope as defined in claim 1, wherein the means for monitoring have an analysis unit with which at least one safety device is activatable.

6. The laser scanning microscope as defined in claim 5, wherein a signal is transmittable to the light source and/or to a further interruption device by the analysis unit and/or the safety device.

7. The laser scanning microscope as defined in claim 6, wherein a delay device is provided in terms of activation of the safety device and/or transmission of the signal.

8. The laser scanning microscope as defined in claim 6, wherein an indication of a malfunction of the interruption device and/or of an activation of the safety device is provided.

9. The laser scanning microscope as defined in claim 1, wherein the interruption device (1) has a mechanical shutter (5).

10. The laser scanning microscope as defined in claim 1, wherein the interruption device (1) has at least two movable components (6, 7) which are configured and arranged so that the mechanical momentum generated by at least one moving component (6) is compensated for by the motion of the at least another component (7).

11. The laser scanning microscope as defined in claim 10, wherein the components (6, 7) have the same mass.

12. The laser scanning microscope as defined in claims 10, wherein at least one component is a counterweight.

13. A shutter (5), used in an optical system, comprising:

a light beam (2) of a laser light source, and at least two movable components (6, 7) being configured and arranged so that the mechanical momentum generated by at least one moving component (6) is compensated for by the motion of at least another component (7).

14. The shutter (5) as defined in claim 13, wherein the components (6, 7) are of identical or mirror-symmetrical configuration.

15. The shutter (5) as defined in claim 13, wherein the components (6, 7) have the same mass.

16. The shutter (5) as defined in claim 13, wherein at least one component is a counterweight.

17. The shutter (5) as defined in claim 13, wherein the components (6, 7) are arranged for straight-line and/or rotational motion.

18. The shutter (5) as defined in claim 13, wherein the components (6, 7) are arranged for oppositely directed motion.

19. The shutter (5) as defined in claim 13, wherein at least one component (6, 7) is configured as a barrier or rocker.

20. The shutter (5) as defined in claim 19, wherein two barriers or rockers are provided.

21. The shutter (5) as defined in claim 13, wherein at least one component (6, 7) has an opening (8) for the light beam (2).

22. The shutter (5) as defined in claim 13, wherein the components (6, 7) are movable by a motion device which converts an electrical signal into a mechanical motion.

23. The shutter (5) as defined in claim 22, wherein the motion device has an electromagnet (9).

24. The shutter (5) as defined in claim 13, wherein means (3) for monitoring the interruption state of the light beam (2) generated by the shutter (5) are associated with the shutter (5).

25. The shutter (5) as defined in claim 13, wherein an optical and/or acoustic indication is provided for indicating the position of the interruption device (1) in or out of the light beam (2).

26. A shutter system for an optical system comprising a light source, said light source adapted to transmit light along a light beam path; said shutter system comprising at least two movable shutter components; said shutter components operatively arranged to intersect said light beam path and configured such that the mechanical momentum generated by at least one moving shutter component is compensated by the motion of at least another shutter component.

27. The shutter system of claim 26 further comprising monitoring means; said monitoring means operatively arranged to monitor the intersection state of said shutter components.

* * * * *